United States Patent
Ding et al.

(10) Patent No.: US 8,041,533 B2
(45) Date of Patent: Oct. 18, 2011

(54) IC DEVICE-IN-POCKET DETECTION WITH ANGULAR MOUNTED LASERS AND A CAMERA

(75) Inventors: Kexiang Ken Ding, San Diego, CA (US); Xiyou Wang, San Diego, CA (US)

(73) Assignee: Delta Design, Inc., Poway, CA (US)

( * ) Notice: Subject to any disclaimer, the term of this patent is extended or adjusted under 35 U.S.C. 154(b) by 0 days.

(21) Appl. No.: 12/149,855

(22) Filed: May 9, 2008

(65) Prior Publication Data

US 2009/0281762 A1    Nov. 12, 2009

(51) Int. Cl.
*G06F 15/00* (2006.01)
(52) U.S. Cl. .......... 702/150; 702/40; 702/159; 702/172; 356/400; 356/490; 356/614; 250/550
(58) Field of Classification Search .................. 702/150, 702/40, 159, 172, 58; 356/400, 490, 509, 356/338, 237.4, 614; 250/550; 382/145
See application file for complete search history.

(56) References Cited

U.S. PATENT DOCUMENTS

| | | | |
|---|---|---|---|
| 4,736,108 A * | 4/1988 | Comstock et al. | 250/559.34 |
| 5,000,573 A * | 3/1991 | Suzuki et al. | 356/490 |
| 5,424,823 A | 6/1995 | Nettles et al. | |
| 5,436,724 A | 7/1995 | Ishizuka et al. | |
| 5,780,839 A | 7/1998 | Livingston | |
| 6,710,868 B2 * | 3/2004 | Guetta | 356/237.1 |
| 6,877,236 B1 * | 4/2005 | Williams | 33/286 |
| 2008/0075353 A1 * | 3/2008 | Tek et al. | 382/145 |

* cited by examiner

*Primary Examiner* — Drew A Dunn
*Assistant Examiner* — Hien Vo
(74) *Attorney, Agent, or Firm* — Foley & Lardner LLP

(57) ABSTRACT

A detection method and apparatus is provided. The detection apparatus includes at least two angular mounted lasers, a surface for receiving laser lines emitted by the angular mounted lasers, a camera for detecting a laser pattern formed by the laser lines on the surface, and a processor for analyzing the laser pattern. The lasers emit orthogonal laser lines on a surface of the device. The camera detects a laser pattern on the surface of the device and the processor analyzes the laser pattern to determine whether the position of the device is in pocket based on the analysis and position algorithms.

10 Claims, 6 Drawing Sheets

IC DEVICE-IN-POCKET DETECTION WITH ANGULAR MOUNTED LASERS AND A CAMERA

BACKGROUND OF THE INVENTION

The following description of the background of the invention is provided simply as an aid in understanding the invention and is not admitted to describe or constitute prior art to the invention.

The present invention relates generally to the field of integrated circuit manufacturing and testing. Specifically, the present invention is directed toward a detection apparatus and method for determining the position and orientation of an integrated circuit (IC) device.

Many techniques have been developed for detecting the position of an object such as an integrated circuit. For example, lasers have been used in position detection applications. U.S. Pat. No. 5,424,823 discloses a system that uses reflected energy signals sensed by light detecting optics to identify flat surfaces that are orthogonal to the detecting optics. U.S. Pat. No. 5,780,839 discloses a laser cross body and feature curvature tracker, which steers a beam of laser energy which is dithered in two directions to scan the surface of a moving object. A laser energy detector senses the reflected laser energy from the target to track the features. U.S. Pat. No. 5,436,724 discloses a diffraction grating including a light beam that is used to measure the relevant movement of an object.

SUMMARY OF THE INVENTION

According to one embodiment, a detection apparatus for detecting a device includes at least two angular mounted lasers, a surface for receiving laser lines emitted by the angular mounted lasers, a camera for detecting a laser pattern formed by the laser lines on the surface and a processor for analyzing the laser pattern.

According to another embodiment, a method for detecting a device, includes emitting two laser lines on a surface of the device, detecting a laser pattern on the surface of the device, analyzing the laser pattern and determining the position of the device based on the analysis, a perspective transform and least mean square best fitting algorithm to determine whether the device is in-pocket.

It is to be understood that both the foregoing general description and the following detailed description are exemplary and explanatory only, and are not restrictive of the invention as claimed.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION OF THE PREFERRED EMBODIMENTS

Embodiments of the present invention will be described below with reference to the accompanying drawings. It should be understood that the following description is intended to describe exemplary embodiments of the invention, and not to limit the invention.

Figure 1:
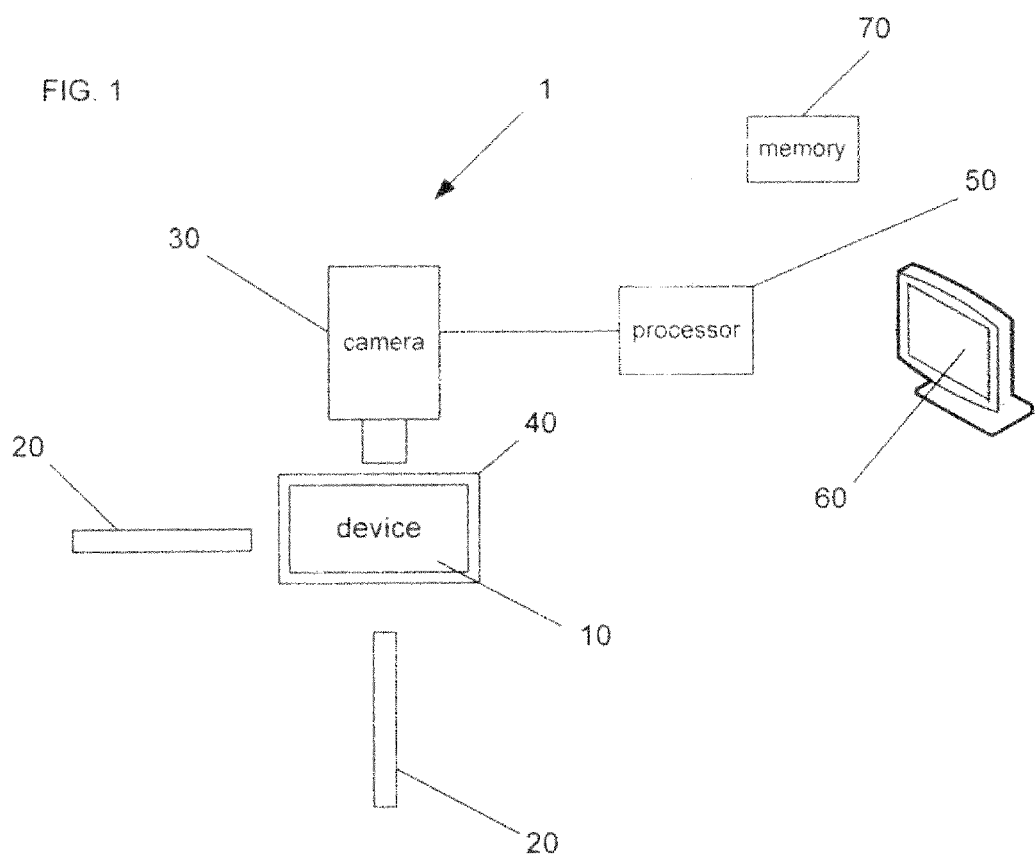
FIG. 1 is a block diagram of a detection apparatus, according to one embodiment.

FIG. 1 is a detection apparatus 1 for detecting a device 10 according to one embodiment. The device 10 can be a semiconductor device, integrated circuit or the like. The detection apparatus 1 has at least two angular mounted lasers 20 and a camera 30. A device 10 on top of a pocket 40 surface is positioned below the lasers 20 and camera 30. Preferably, the pocket 40 surface is in a tray for carrying devices. A device 10 can be placed on the pocket 40. A processor 50 is operably connected to the camera 30 for executing vision software to analyze the images captured by the camera 30. The processor 50 is operably connected to an output 60 for communicating the processor 50's results to a user. In addition, the processor 50 is operably connected to a memory 70 for storing information generated by the processor.

Figure 2:
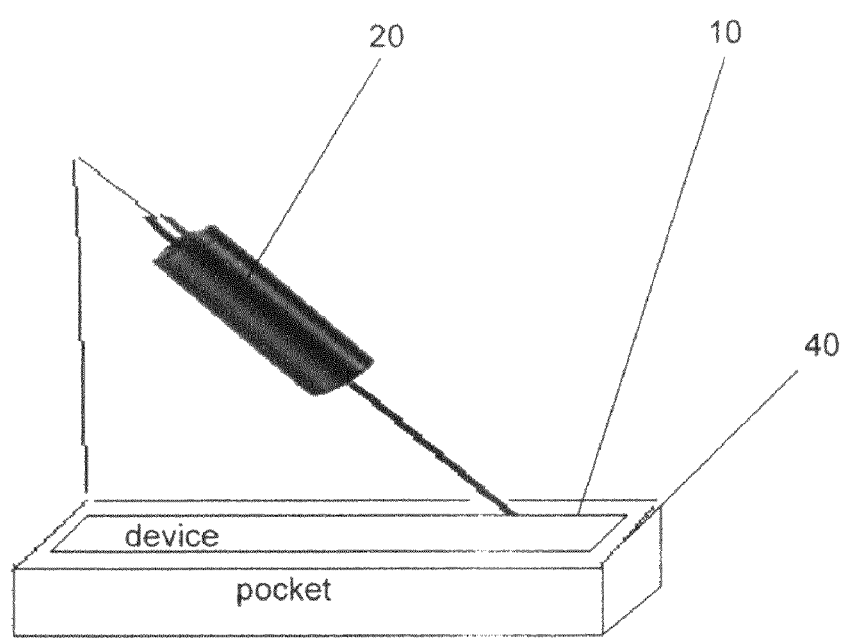
FIG. 2 is a perspective view of an angular mounted laser, according to one embodiment.
Figure 3:
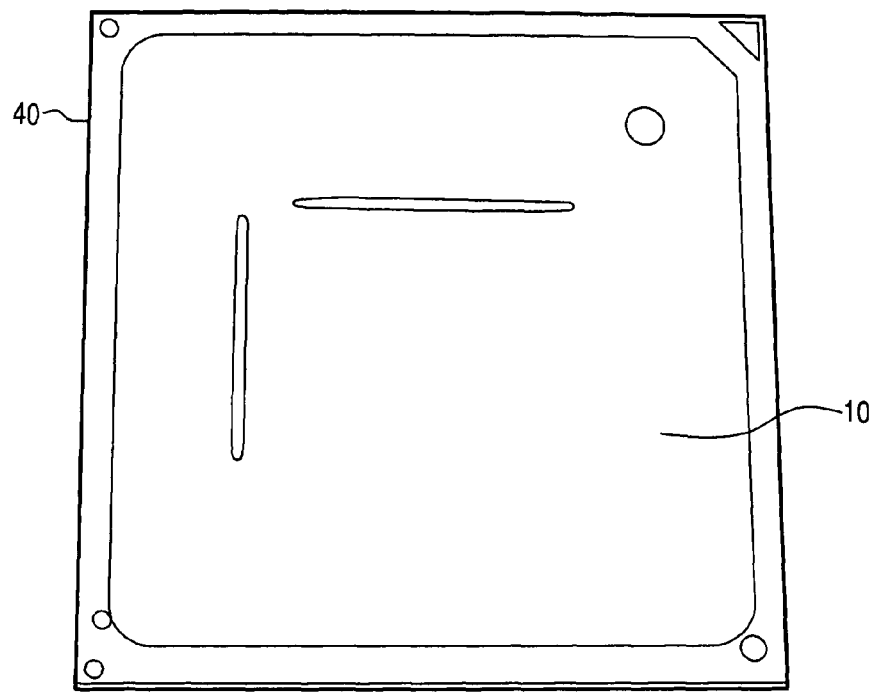
FIG. 3 is a top view of laser lines being emitted on a device, according to one embodiment.

The angular mounted lasers 20 can be mounted in the range of 2.5 to 5 inches from the device 10. In addition, as shown in FIG. 2, the angular mounted lasers 20 are mounted at a certain angle relative to the surface 10. For example, the angular mounted lasers can be mounted in the range of (45°+/−10°) relative to the surface 10. Preferably, the angular mounted lasers 20 are mounted at 45 degrees relative to the surface 10. The angular mounted lasers 20 emit laser lines on the surface 10. According to one embodiment, the lasers 20 are two red line pattern lasers, however, a different pattern, color and lower cost laser can be used as well. The laser lines form a non-parallel pattern on the surface 10. Preferably the laser lines are orthogonal. For example, FIG. 3. shows a laser line pattern being formed on a device 10.

The camera 30 captures the pattern formed by the laser lines on the surface 10. For example, when a device 10 is present in the pocket 40, the laser lines form a specific type of pattern on the device 10. The images captured by the camera 30 are fed into the processor 50. The processor 50 analyzes the images and can determine whether there is a device 10 present and in the correct position (in-pocket), there are two or more devices 10 stacked upon each other (double stack), or if there is not a device 10 present (empty pocket). The processor 50 can also detect bent pins in a device 10 pin grid array by determining whether all the pins of a device are properly inserted into mask pinholes.

Figure 4:
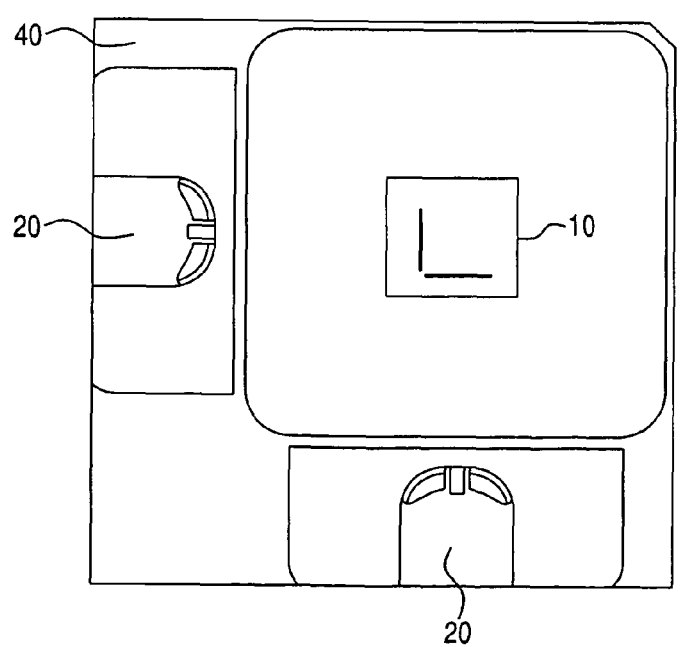
FIG. 4 is a top view of angular mounted lasers and laser lines being emitted on a device, according to one embodiment.
Figure 5:
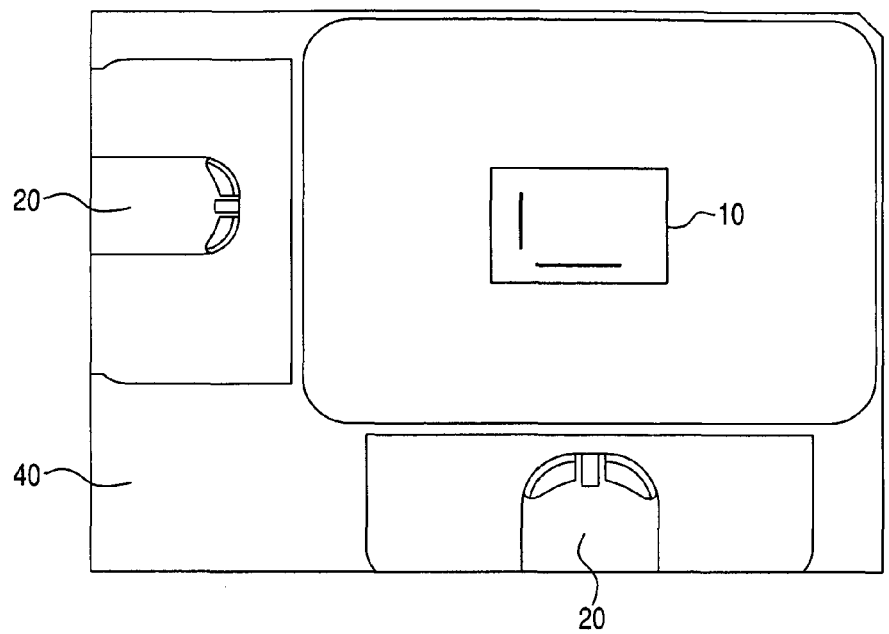
FIG. 5 is a top view of angular-mounted lasers and laser lines being emitted on a device out of pocket with a device surface tilt relative to the camera's optical axis, according to one embodiment.

FIG. 4 is an example of the laser line pattern formed when an in-pocket device 10 is present in the pocket 40. FIG. 5 is an example of a laser line pattern formed when a device 10 is positioned out of the pocket 40. The surface of the device 10 is tilted relative to the camera's 30 optical axis because the device 10 is touching a ramped up edge of the pocket 40. As shown, the laser lines emitted by both lasers 20 are shifted toward the outside perimeter of the device 10 as compared to the laser line position of the in-pocket device 10 shown in FIG. 4. In contrast, when a device 10 is not present (empty pocket) the emitted laser lines are shifted toward the center of the device 10 as compared to the laser line position of the in-pocket device 10 shown in FIG. 4. According to one embodiment, the above-mentioned patterns (in-pocket, double stack, empty pocket) are saved by the processor 50 in memory 70 as trained patterns.

Figure 9:
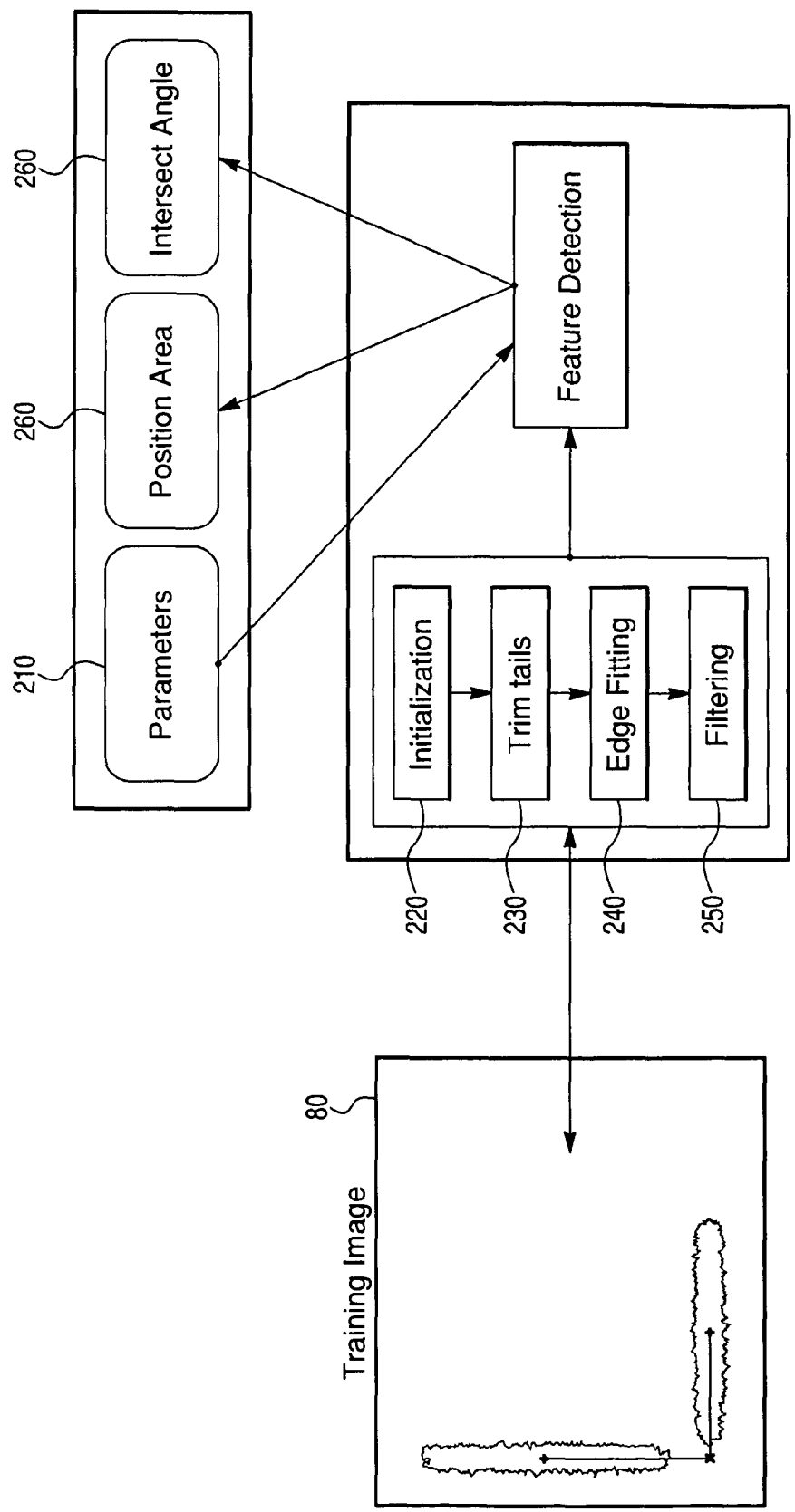
FIG. 9 is a flow chart illustrating a method for acquiring training patterns for use in determining the presence and position of a device.

FIG. 9 is a flow chart illustrating a method for acquiring training patterns for use in determining the presence and position of a device 10. After parameters are set (Step 210), a training procedure with a trained image pattern 80 is used. The procedure includes initialization (Step 220), trim tails (Step 230), edge fitting (Step 240) and filtering (Step 250). The intersection position and the cross line orthogonality are stored as a pattern to be used for runtime (Step 260).

Figure 6:
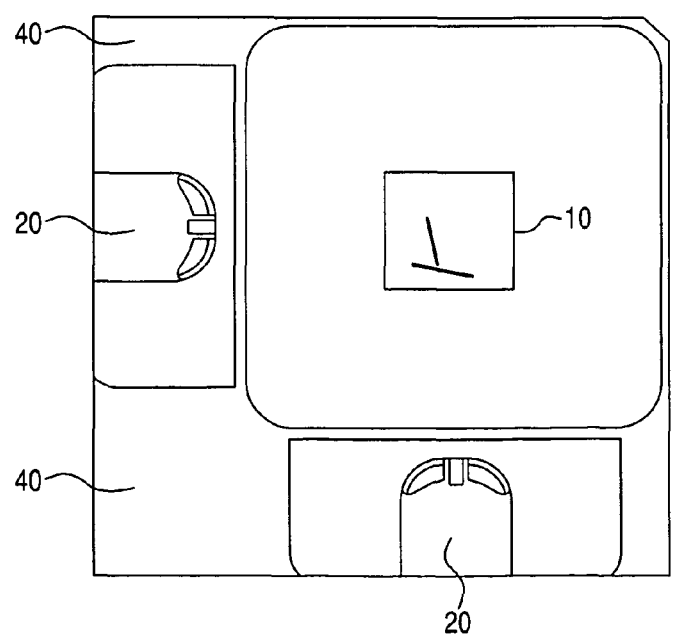
FIG. 6 is a top view of angular mounted lasers and laser lines being emitted on a device out of pocket with a complex device surface tilt relative to the camera's optical axis, according to one embodiment.
Figure 8:
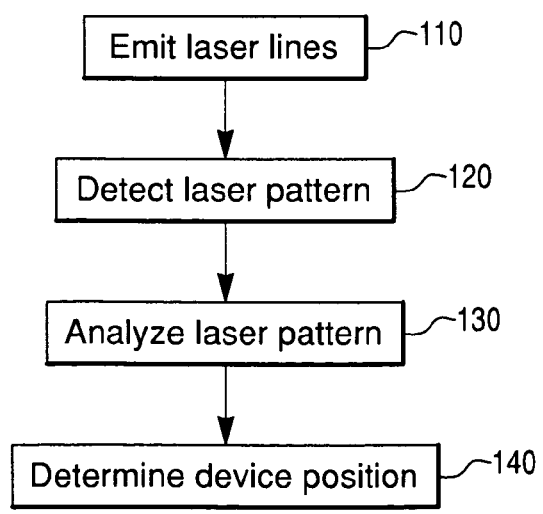
FIG. 8 is a flowchart illustrating a method for detecting the presence and position of a device, according to one embodiment.

Operation of the detection apparatus 1 with reference to FIG. 8 will now be described. During operation, a device 10 is positioned in the pocket 40, then laser lines are emitted by the angular mounted lasers 20 on the device 10 (Step 110). The image the laser lines form on the device 10 is captured by the camera 30 (Step 120). The processor 50 compares the position and angle differences of the laser lines to the stored trained laser line patterns (Step 130). Based on the comparison, given predefined tolerances, the processor 50 determines the position/orientation (in-pocket, double stack, empty pocket) of the device 10 (Step 140). For example, if the position difference is outside of a position tolerance and the angle of the device is within an angle tolerance then the processor 50 determines that the tested device 10 has a different thickness than the trained device 10. If the difference in the angles between the laser lines is outside of a certain tolerance (as shown in FIG. 6), then the processor determines that the device 10 is tilted. Accordingly, the detection apparatus can detect whether a device 10 is in-pocket since a drastic change in the surface height and surface tilt are characteristics of a device 10 that is not correctly inserted into a pocket of a tray, a socket, a shuttle, etc.

To compute the tilt angle of the part, the following formula is used. Let (x, y) be the coordinates of the points on the device before any tilt, and (x', y') be the coordinates of the point when tilted, then the relationship between the two coordinates could be expressed as:

$$X'=AX+CY+E+GX'X+HX'Y$$

$$Y'=BX+DY+F+GY'X+HY'Y$$

Note this model is no longer linear. Since there are eight freedoms in this model, at least four points (not on the edges of same triangle) are needed to determine the perspective transform coefficients. For higher accuracy, in practice, more points are used with a LMS (Least-Mean-Square) algorithm to obtain the coefficients.

The relationship between the tilted angles and the coefficients of the model are determined by the perspective transform.

Figure 7:
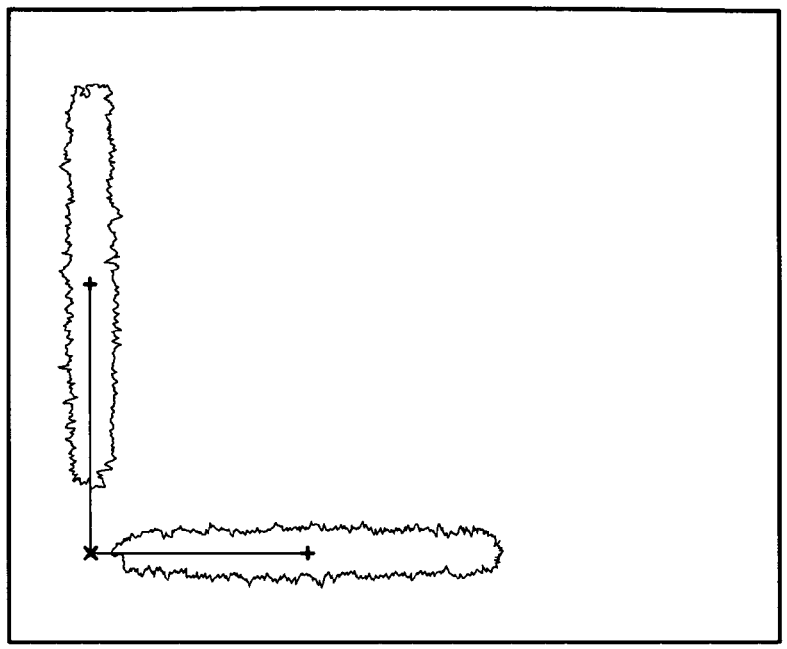
FIG. 7 is a top view of laser lines being emitted on a device, according to one embodiment.

FIG. 7 shows a real laser image. To increase the signal to noise ratio, the processor 50 trims the two tails of each laser line based on the trained laser patterns. The processor 50 filters noise around the laser lines with a low pass signal filter. The processor 50 determines the major axis using a moment algorithm, then filters using tail-trimming and edge-fitting algorithms. The processor 50 determines the cross point of the laser lines and the angle of the two laser lines using a cross point and the angle between the two major axes of the laser lines.

Based on the description provided above, the detection apparatus 1 has several advantages. The detection apparatus provides an accurate and universal solution for identifying device placements in a pocket. In addition, the detection apparatus can be generated from existing handler equipment, thus, significantly reducing the cost for implementing the detection apparatus. Further, the detection apparatus can be used for several vision sensing applications including bent lead inspection, surface height detection and tilt inspection.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A detection apparatus for detecting a device, comprising:
   at least two angular mounted lasers configured to form a laser pattern on a surface of the device;
   a pocket, configured to receive the device in a position wherein the surface of the device is exposed to the laser pattern emitted by the at least two angular mounted lasers;
   a camera for detecting the laser pattern formed by the laser lines on the surface of the device; and
   a processor for analyzing the laser pattern, wherein the processor is configured to determine whether the device is present and in a predetermined position in the pocket surface based on the laser pattern.

2. The detection apparatus of claim 1, wherein the surface is a device substrate.

3. The detection apparatus of claim 1, wherein the angular mounted lasers emit straight line laser patterns.

4. The detection apparatus of claim 1, wherein the angular mounted lasers are mounted at angle in the range of thirty-five to fifty-five degrees relative to the normal direction of the device surface.

5. The detection apparatus of claim 1, wherein the laser lines are projected on the device surface ninety degrees relative to each other.

6. The detection apparatus of claim 1, wherein each of the angular mounted lasers are mounted at the same angle relative to the normal direction of the device surface.

7. A method for detecting a device in a pocket, comprising:
   emitting laser lines on a surface of the device to form a laser pattern on a surface of the device;
   detecting the laser pattern on the surface of the device;
   analyzing the laser pattern;
   determining at least one of a height or tilt of the surface of the device in relation to a surface of the pocket based on the analysis, a perspective transform and least mean square best fitting algorithm; and
   determining whether the device is present and in a predetermined position in the pocket surface based on the laser pattern.

8. The method of claim 7, further comprising determining whether a plurality of pins located on the device are properly inserted into mask pinholes.

9. The method of claim 7, wherein the analyzing step comprises:
- analyzing at least one of the positions, orthogonality, angle, shape or size of the laser pattern;
- comparing the laser pattern with a trained laser pattern;
- calculating the positional and angular differences between the laser pattern and calibrated laser pattern; and
- based on the calculated positional and angular differences, determining the position of the device.

10. The method of claim 7, wherein the analyzing step further comprises:
- trimming a tail of the laser lines according to a calibrated laser line, to increase the signal to noise ratio of the laser lines; and
- filtering noise surrounding the laser lines with a low-pass filter.

* * * * *